(12) United States Patent
Brugger

(10) Patent No.: US 9,410,837 B2
(45) Date of Patent: Aug. 9, 2016

(54) DISPENSER

(71) Applicant: Gerhard Brugger, Pflach (AT)

(72) Inventor: Gerhard Brugger, Pflach (AT)

( * ) Notice: Subject to any disclaimer, the term of this patent is extended or adjusted under 35 U.S.C. 154(b) by 0 days.

(21) Appl. No.: 13/936,168

(22) Filed: Jul. 6, 2013

(65) Prior Publication Data

US 2014/0054317 A1    Feb. 27, 2014

(30) Foreign Application Priority Data

Jul. 6, 2012    (DE) .................... 20 2012 006 466 U

(51) Int. Cl.
| | | |
|---|---|---|
| B05B 11/00 | (2006.01) | |
| G01F 13/00 | (2006.01) | |
| B65D 83/52 | (2006.01) | |
| B65D 83/68 | (2006.01) | |

(52) U.S. Cl.
CPC ............ *G01F 13/00* (2013.01); *B05B 11/3015* (2013.01); *B05B 11/3083* (2013.01); *B05B 11/3084* (2013.01); *B65D 83/525* (2013.01); *B65D 83/68* (2013.01); *B05B 11/0037* (2013.01); *B05B 11/0064* (2013.01); *B05B 11/3004* (2013.01); *B05B 11/3052* (2013.01)

(58) Field of Classification Search
CPC ............ B05B 11/3095; B05B 11/3083; B05B 11/3084
USPC ............ 222/135, 144.5, 309, 386, 137, 145.7
See application file for complete search history.

(56) References Cited

U.S. PATENT DOCUMENTS

| | | | | |
|---|---|---|---|---|
| 5,169,029 | A * | 12/1992 | Behar et al. ...................... 222/1 |
| 6,083,528 | A * | 7/2000 | Elliesen ................. A61K 31/57 |
| | | | | 221/206 |
| 6,464,107 | B1 * | 10/2002 | Brugger ........................ 222/134 |
| 8,684,200 | B2 * | 4/2014 | Kountotsis ........................ 215/6 |
| 8,807,399 | B2 * | 8/2014 | Ritzenhoff et al. ............ 222/309 |
| 2012/0298694 | A1 * | 11/2012 | Holzmann ..................... 222/135 |
| 2013/0299514 | A1 * | 11/2013 | Holzmann ..................... 222/134 |

FOREIGN PATENT DOCUMENTS

WO    WO 2011047882 A1 *    4/2011

* cited by examiner

*Primary Examiner* — Paul R Durand
*Assistant Examiner* — Charles P Cheyney
(74) *Attorney, Agent, or Firm* — Venable LLP; Michele V. Frank

(57) ABSTRACT

A dispenser for dispensing at least two components simultaneously uses ramp shaped wedge members to adjust the ratio of the components being dispensed. The components to be dispensed are disposed in separate containers each forming or connected to a pump. The ramp of the wedge members controls the stroke of the pump.

15 Claims, 4 Drawing Sheets

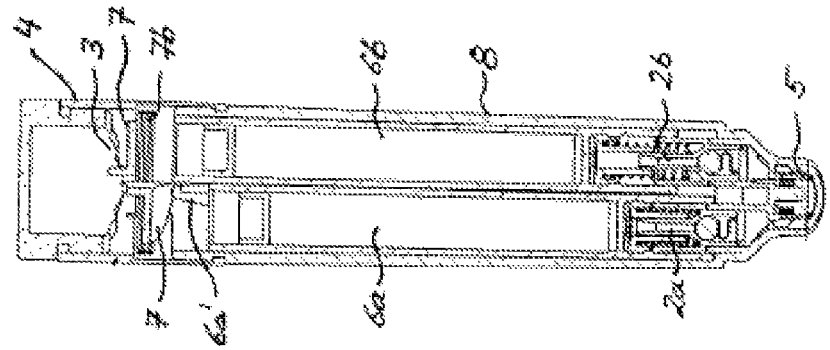
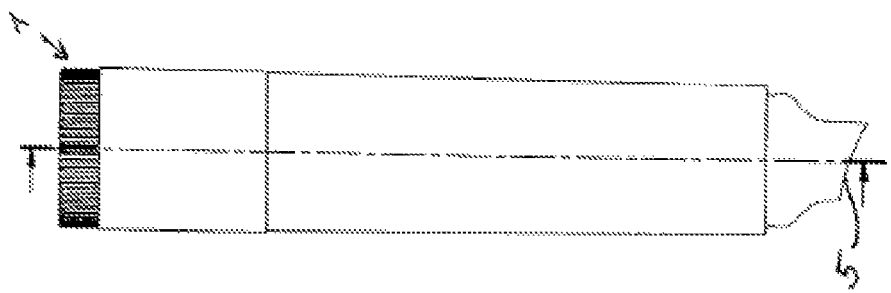
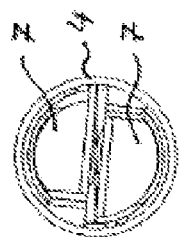
Fig. 1A
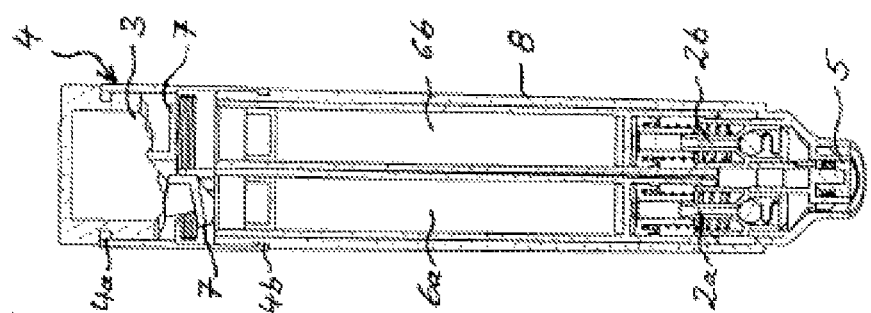
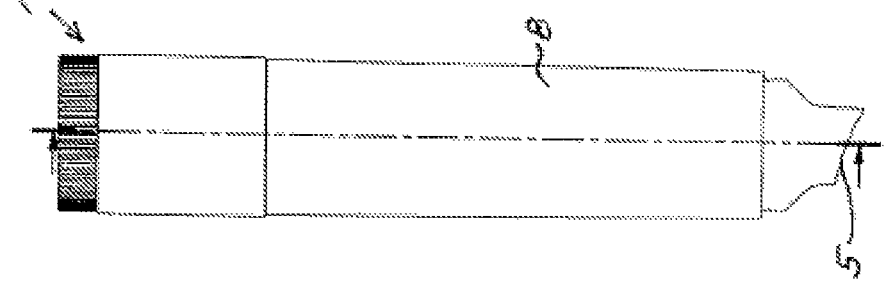
Fig. 1B

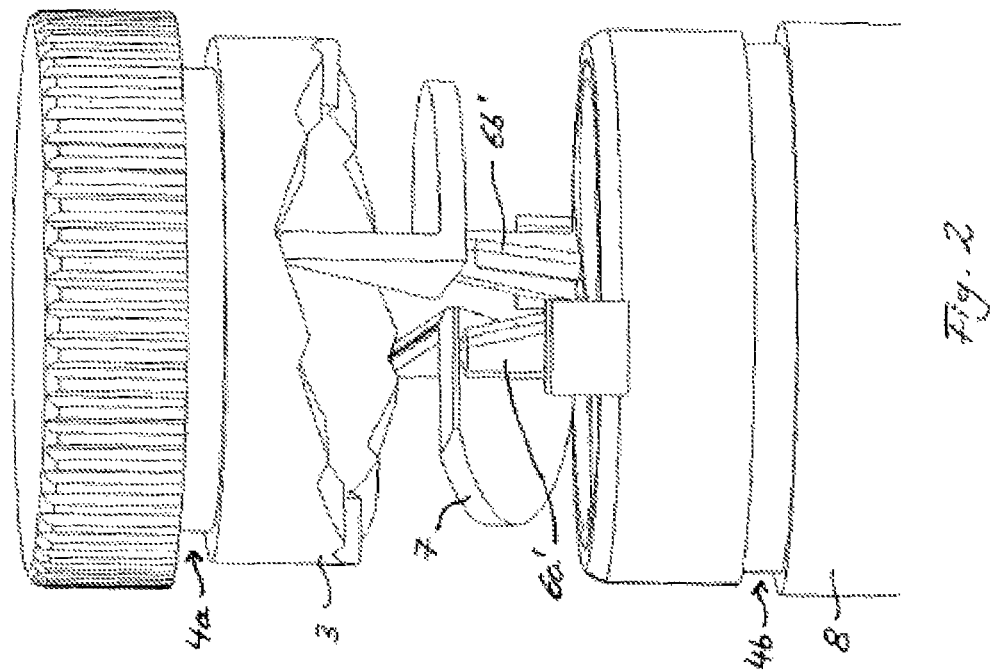
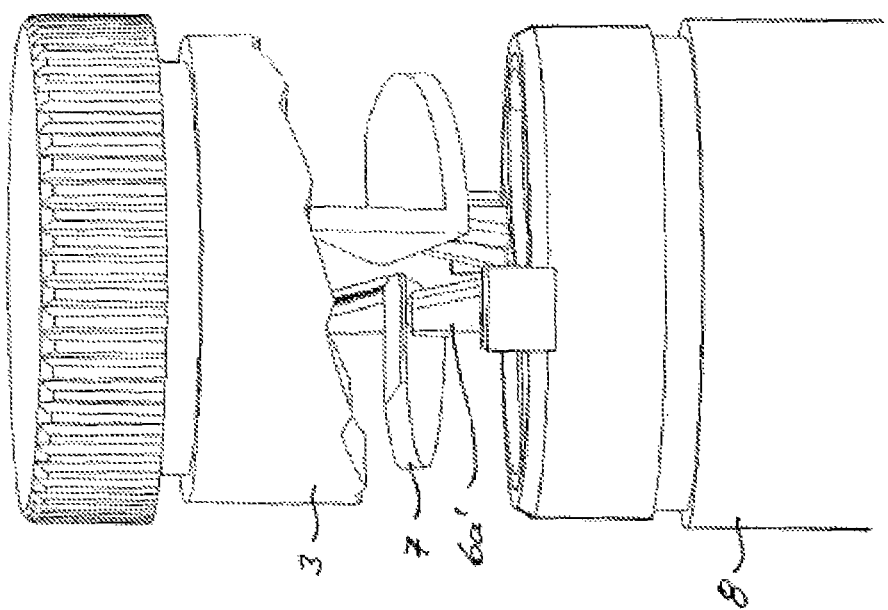
Fig. 2

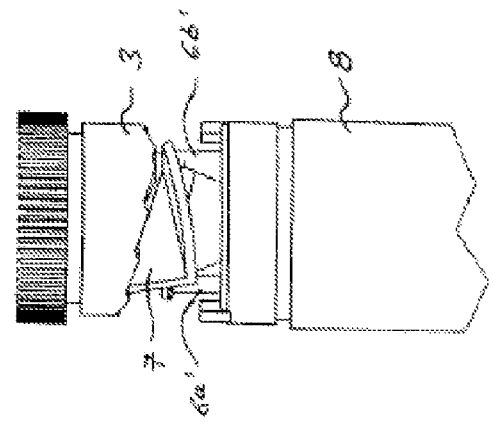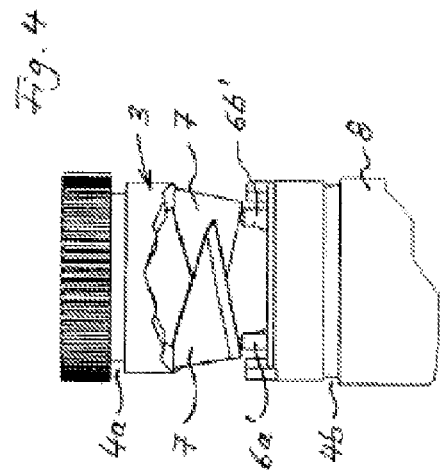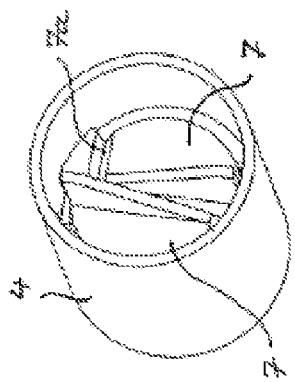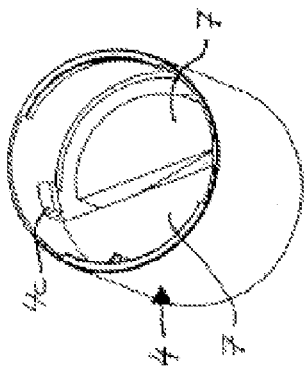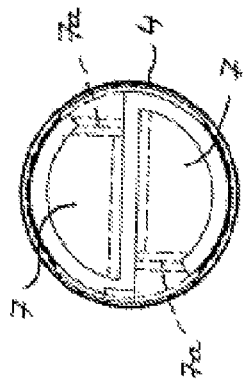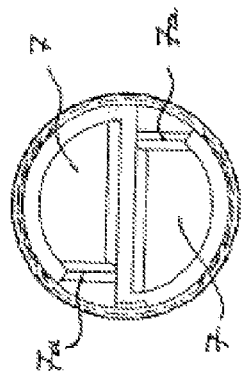

DISPENSER

The invention relates to a dispenser for dispensing a substance consisting of at least two components.

Such a dispenser is disclosed in EP 1 104 336, wherein the mixing ratio of two liquid or pasty components is adjustable. Thus, the dispenser is adapted to the consumer who can choose the mixing ratio of the components and elect the mixed components according to his or her personal needs. The dispenser is provided with two cartridges and associated pump units, which are pivotable via a transfer member, wherein the pivot axis is adjusted relative to the actuated pump.

A disadvantage of that known dispenser is that the operation requires axial pressure and thus does not always meet the user's needs, as a rotation or lateral actuation is often preferred for certain products. In addition, the transfer member of the known dispenser is simultaneously used for setting the mixing ratio of the components. In case of failure of the transfer element dispensing from the dispenser is blocked. In addition, due to the dual function of the transfer element its construction and installation is relatively complicated and restricted by product design.

Thus, the present invention seeks to overcome the disadvantages of the prior art and to provide a dispenser, which offers a structurally simple and user-friendly setting of the mixing ratio and actuation of the dispenser.

This object is achieved by a dispenser in which ramp-shaped wedge members (7) are provided adjacent to the adjusting means (3) for actuating the pump units (2a, 2b) and/or containers (6a, 6b).

According to the invention, a dispenser is provided for dispensing a substance consisting of at least two components wherein the dispenser comprises at least two containers for the components of the substance. The containers may be formed in the manner of cartridges,
i. e. with a rigid shell, but can also be a flexible bag or bottle. This allows a releasable replacement of the cartridges and movement or displacement in the dispenser during the dispensing and operation. The particular design of the containers also depends on the viscosity of the components. Furthermore, a pump unit is arranged on each of the containers for removal of the respective components. The pump units can be designed as a piston pump, a bellows pump, or in any other suitable construction. The dispenser further comprises adjusting means for setting the ratio of the components of the substance and a movable actuating device for the pump unit, as well as a dispensing nozzle for dispensing of the substance.

The dispenser is characterized in that ramp-shaped wedge members are arranged adjacent to or in contact with the adjusting means. The wedge members provide a transmission so that the operating forces are small. When an adjusting means is preferably provided around the vertical rotating axis, a spiral-like or step-like tapered ring is easily accessible and preferably arranged at the upper end of the dispenser. Preferably, the rotation wedge ring is rotatably mounted on the actuating means, being in particular sleeve-shaped, so that a compact, simple design is provided. The helical or stepped surface of the adjusting means faces the containers or pump units, wherein the dosage setting (except for 50:50) is achieved by a different angle of the wedge members to the containers and pump units. The setting of the mixing ratio of the components is carried out by changing the angle of the wedge members relative to the pump units or containers abutting surfaces of the wedge elements. Thus, the stroke of the pump units is varied and consequently the quantity of the respective pump unit for each component is changed. The two components can be mixed, if necessary, or can be unmixed, especially in an applicator according to WO 2006/11273 of the present Applicant.

The dispenser according to the invention has an improved structure as described above, since the adjusting means is formed as a separate, simple unit which can be accurately set. Furthermore, the operation of the dispenser can be made in a sideway manner or via rotation of the wedge members. Alternatively to a direct action on the pump units via the wedge members and the actuating device, as preferred, there is also the possibility to fix the pump units in the dispenser and to actuate on the containers via the wedge members and the actuating device, such that the containers are pressed towards the pump units with a set stroke and the dispensed amount of components corresponds to a defined mixing ratio.

In an advantageous embodiment, the housing of the dispenser or its outer sheath is used as a guide for the actuating device, which rotates the two wedge members each having a hinge such that the (lower) wedge surfaces urge against the container and pump units. Preferably, the adjusting means is above the actuator to be gripped easily and formed in a rotatable way such that the adjusting means is readily accessible. The periphery thereof is preferably corrugated so that the rotation of the adjustment means can be finely adjusted. It is expedient if the adjustment device is designed to rotate continuously, or having a plurality of detent positions defined for the rotation of the adjustment means. In the configuration with continuous rotation the adjustment can be made for free choice of the mixing ratio. By definition of detent positions adjustable mixing ratios are specified, i. e. the number of detent positions is adapted to the desired resolution of the mixing ratio (f. i. by 2% or 5% steps).

Further advantages, features and characteristics of the invention will become apparent from the following description of preferred embodiments of the invention with reference to the schematic drawings. In the drawings:

FIG. 1A, FIG. 1B is an illustration of the inventive dispenser with adjustment means and an associated actuator, left in the non-actuated position and right in the operating position of the pump units, FIG. 2 is a schematic representation of the adjusting in various setting positions (left with 50:50 and right with a 99:1 ratio);

FIG. 3 four illustrations with two perspective views and a top and bottom view of the wedge members and the associated actuating device;

FIG. 4 is a side view of the upper portion of the dispenser with a rotating adjusting means and an actuator (not detailed), wherein the top view shows the non-actuated position and the bottom view shows the operated position;

Figure 5B:
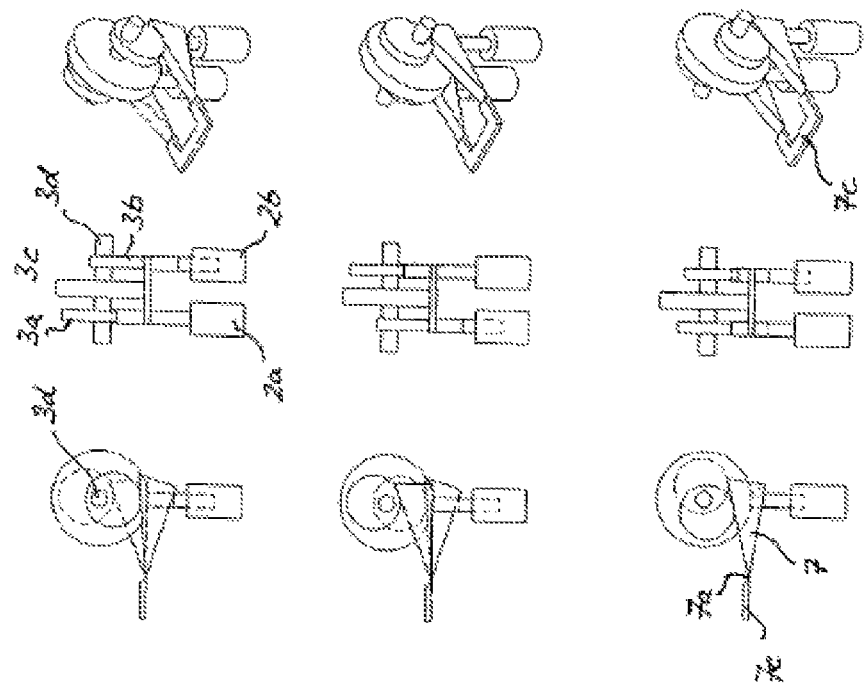
FIG. 5A, FIG. 5B are other embodiments of the dispenser, but shown here without a housing, wherein an actuator in this modification is formed as a pull handle, shown in FIG. 5B.

FIG. 1A and FIG. 1B show a cylindrical dispenser 1, wherein FIG. 1A represents a non-actuated state and FIG. 1B illustrates an actuated position. These figures each show an overall view with a section line and at the right side a corresponding sectional side view, as well as a corresponding cross-sectional view below illustrating wedge members 7, wherein the adjustment of the mixture is performed by rotating adjusting means 3 being arranged at the dispenser top. The adjusting means 3 in this embodiment is constructed in the manner of a sleeve with stair-like steps on its underside. The wedge elements 7 are pressed by the actuating device 4 to underlying pump units 2a, 2b and the pressure is transmitted to slidable containers 6a and/or 6b mounted in the housing 8, such associated rams 6a' and 6b' are suppressed by the wedge elements 7 (more precisely their downward surfaces). When the sleeve-shaped actuator 4 is twisted around its vertical axis (corresponding to the section line shown in FIG. 1), for example around 120° the pivotally mounted wedge members 7 are also rotated within the actuator 4, as seen from the comparison of the two cross-sections at the bottom of FIG. 1A and FIG. 1B. Here, the sleeve-shaped actuating device 4 is always turned back into their starting position by a return spring 7b. At the upper end of the actuating device or actuator 4, the adjusting means 3 is rotatably fixed to a groove 4a, while a similar groove 4b is provided at the lower end of the actuator 4 for fixing to the housing 4.

By this rotation of the wedge members 7 around the vertical axis (cf. the different positions in the bottom views in FIG. 1A and FIG. 1B) different pump strokes via different angles of the wedge elements 7 are achieved, as predetermined by the adjusting means 3. Thus, the substance will be delivered here at the bottom via a dispensing nozzle 5 (here with mixing). Upon actuation of the actuator 4 (here by turning around 120° as in in FIG. 1B) only the left pump unit 2a is active via the steeply orientated left wedge member 7. Thus, the left pump unit 2a has a stroke or delivery of about 99% of the total. The right pump unit 2b, which is not or hardly actuated here, since the right wedge member 7 has a very flat angle or is almost aligned horizontally (cf. also FIG. 2, right side), so that only a small volume of about 1% is supplied (based on the total issue amount). Thus, the discharged substance essentially contains only components of the component pumped by the pump unit 2a. If the setting is changed, f. i. by 90° rotation compared to the position in FIG. 1B, the adjustment takes a position according to FIG. 2, left side. In this setting the orientation angles of the two wedge members 7 are identical, so that a dosing ratio of 50% to 50% is produced.

In the position according to FIG. 2, right side, the left wedge member 7 contacts the lowest point of the adjusting means 3 so that the lower surface of the wedge member 7 abutting the ram 6a' is rather steep, while the other, right wedge element 7 acts on the ram 6b' in a very flat angle. Thus, on rotation of the sleeve type actuator 4 (omitted here for reasons of clarity) the associated pump unit 2a makes a large stroke (delivering nearly 100%), while the right pump unit 2b (cf. FIG. 1B) does not perform a conveying (about 0%). Thus, the discharge rate of the substance contains only ingredients of the pump unit 2a, i.e. only the component out of the container 6a.

By twisting the adjusting means 3 around 90°, starting from the right side of FIG. 2, the middle position (left in FIG. 2) is reached, i.e. a "symmetric" alignment as also shown in FIG. 4, in which the non-actuated position is shown in the upper half and the pump position in the lower half. In this middle position the slope or angles of the wedge members 7 towards the two pump units 2a and 2b and the rams 6a' and 6b' are identical. Thus, both containers 6a and 6b are pressed downwards by the same axial distance, so that both pump units 2a, 2b have identical strokes or dispensing of 50% of the total amount. Thus, the mixture or substance contains equal parts of the two components. At intermediate positions of the adjusting means 3 between the positions mentioned above, corresponding intermediate ratios between the strokes or dispensed volumes of the pump units 2a, 2b are delivered so that each component can be continuously changed between 0%:100% and 100%:0%.

FIG. 3 shows two perspective views of the wedge elements 7, which are here mounted within the actuating device 4 by means of film hinges 7a. This is also illustrated in top and bottom views. The film hinges 7a of the cross-sectional L-shaped wedge members 7 are located in opposition, such that they can take (differently inclined) positions towards the adjusting means 3 (cf. FIG. 4). The illustrated device is preferably made as an integral injection-molded part, and thus inexpensive, which is also easy to assemble with a snap-in connection 4c (shown here upper left) to the grooves 4a and 4b (see FIG. 1A in the mounted position). It should be noted that in FIG. 4 the outer shell is omitted to represent the "inner elements" of the actuator 4.

Figure 5A:
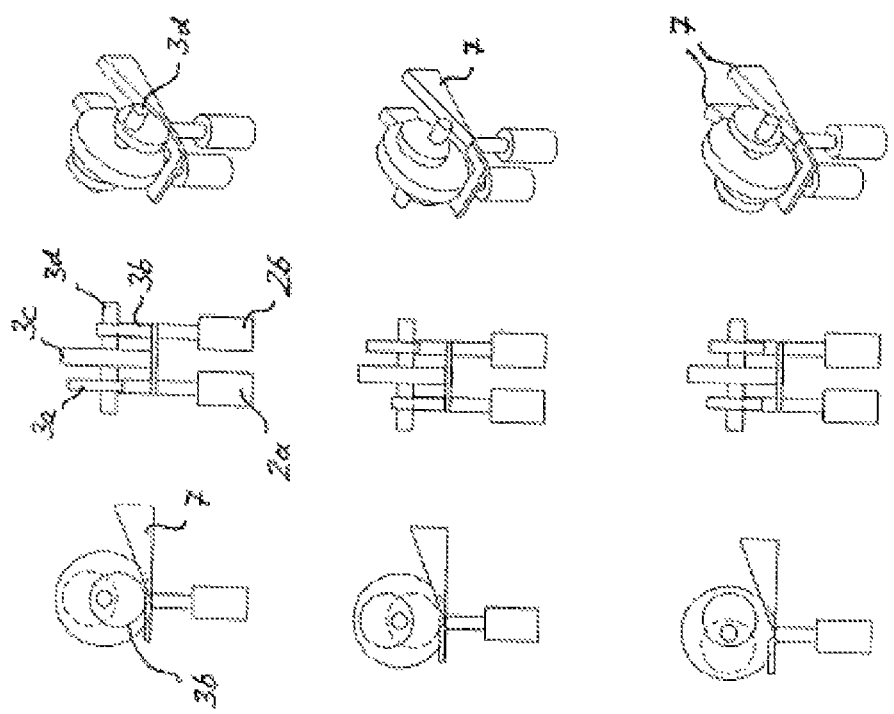

FIG. 5A and FIG. 5B show a modified embodiment, wherein the pump units 2a, 2b are located directly below the wedge members 7, i.e. are no longer actuated indirectly via the slidable containers 6a and 6b. In addition, the wedge members 7 are here slidable in contrast to the rotational motion in FIG. 1 to FIG. 4. In the left view of FIG. 5A, the wedge members 7 are only slightly inserted between the pump units 2a, 2b and the adjusting means 3 located above with an eccentric axis 3d. Further, the eccentric axis 3d (supported in the housing 8—not detailed here) bears an eccentric 3a for the pump unit 2a and a 180° offset eccentric 3b for the pump unit 2b, being turnable with a central wheel 3c to assume the position shown, so that the mixing ratio can be in the range 0:100, and 100:0, wherein the middle row in FIG. 5A shows a 50:50 ratio. FIG. 5B shows the corresponding adjustments, but each in the pump or actuating position.

The setting of the mixture is thus effected by simply rotating the eccentric axis 3d of the adjusting means 3. The actuation is here carried out by simply inserting the wedge members 7 with a pull handle 7c at the pointed end of the wedge members 7 in the region 7a of the film hinges, wherein the pull handle 7c projects to the outer circumference of the housing 8. In a reversed arrangement, highs ends of the wedge members 7 might be provided with a push button (not shown). In both cases, a return spring for pushing back the two wedge members 7 to their initial position according to FIG. 5A can be provided (not shown here). Markers on the dial or wheel 3c there can also be provided for coincidence with a scale to a predetermined dosage ratio (for example 35:65). This version with the eccentrics 3a, 3b allows continuous adjustment of the mixing ratio, but also allowing a stepped design.

LIST OF REFERENCE NUMERALS

1: Dispenser
2a, b: pump unit
3: adjusting means
3a, b: eccentric
3c: wheel
3d: eccentric axis
4: actuating device
4a, 4b: grooves
4c: connection
5: dispensing nozzle
6a, 6b: container
6a', 6b': ram
7: wedge member
7a: hinge
7b: return spring
7c: pull handle
8: housing

What is claimed is:
1. A dispenser for dispensing a substance consisting of at least two components, comprising:
at least two containers with ram portions extending from an end of the at least two containers, the at least two containers being configured for receiving the components of the substance;
a pump unit at an other end of each of the containers;

adjusting means for setting the quantitative ratio of the components of the substance, the adjusting means including a spiral-like or step-like tapered ring provided around a rotation axis of the adjusting means;

a movable actuating device for the pump units;

a dispensing nozzle of the substance to be dispensed by the dispenser; and characterized in that ramp-shaped wedge members provided adjacent to the adjusting means for actuating the pump units or containers, each wedge member being in contact with its respective ram of the container.

2. The dispenser according to claim 1, wherein the wedge members are arranged pivotably or slidably relative to the rams of the containers.

3. The dispenser according to claim 1, wherein the wedge members are directly or indirectly rotated by the actuating device.

4. The dispenser according to claim 1, wherein the adjusting means is turnable above the actuating device.

5. The dispenser according to claim 1, wherein the wedge member members have film hinges at their tip ends.

6. The dispenser according to claim 1, wherein each pump unit and container is associated with at least one wedge member.

7. The dispenser according to claim 1, wherein the adjusting means is continuously rotatable or has a plurality of locking positions for defined rotation of the adjusting means.

8. The dispenser according to claim 1, wherein the wedge members have L-shaped cross-sections.

9. The dispenser according to claim 1, wherein the pump units are disposed adjacent to the dispensing nozzle.

10. The dispenser according to claim 1, wherein the actuating device is formed as a substantially ring-shaped, rotary sleeve or as a pull handle.

11. The dispenser according to claim 1, wherein the wedge members interact with an eccentric axis of the adjusting means.

12. The dispenser according to claim 11, wherein the eccentric axis is horizontally mounted to the adjusting device.

13. The dispenser according to claim 1, wherein the angles of the wedge members towards the pump units or containers is adjustable via the adjustment means.

14. The dispenser according to claim 1, wherein the quantitative ratio is adjusted in opposite directions.

15. The dispenser according to claim 1, wherein the wedge members or the actuating device is reset after operation by a return spring.

* * * * *